(12) United States Patent
Schuler et al.

(10) Patent No.: US 8,507,149 B2
(45) Date of Patent: Aug. 13, 2013

(54) PLANT WITH HIGH-TEMPERATURE FUEL CELLS AND CLAMPING DEVICE FOR A CELL STACK

(75) Inventors: Alexander Schuler, Constance (DE);
Dirk Haberstock, Winterthur (CH);
Roland Denzler, Weisslingen (CH);
Michael Tamas, Winterthur (CH);
Jeannette Clifford, Winterthur (CH)

(73) Assignee: Hexis AG, Winterthur (CH)

( * ) Notice: Subject to any disclaimer, the term of this patent is extended or adjusted under 35 U.S.C. 154(b) by 802 days.

(21) Appl. No.: 11/886,808

(22) PCT Filed: Feb. 14, 2006

(86) PCT No.: PCT/CH2006/000096
§ 371 (c)(1),
(2), (4) Date: Jan. 6, 2009

(87) PCT Pub. No.: WO2006/099757
PCT Pub. Date: Sep. 28, 2006

(65) Prior Publication Data
US 2009/0214914 A1    Aug. 27, 2009

(30) Foreign Application Priority Data
Mar. 21, 2005  (EP) ................. 05405253

(51) Int. Cl.
| H01M 2/08 | (2006.01) |
| H01M 2/14 | (2006.01) |
| H01M 10/50 | (2006.01) |
| H01M 2/24 | (2006.01) |
| H01M 6/42 | (2006.01) |

(52) U.S. Cl.
USPC ........... 429/511; 429/120; 429/158; 429/159; 429/172; 429/507

(58) Field of Classification Search
None
See application file for complete search history.

(56) References Cited

U.S. PATENT DOCUMENTS

| 7,314,680 B2 * | 1/2008 | Bai et al. .................. 429/413 |
| 2009/0202878 A1 * | 8/2009 | Schild ..................... 429/26 |

FOREIGN PATENT DOCUMENTS

| EP | 1 037 296 A1 | 9/2000 |
| EP | 1 120 845 A1 | 8/2001 |
| EP | 1 347 529 A2 | 9/2003 |
| EP | 1 347 529 A3 | 9/2003 |
| JP | 1030175 A | 1/1989 |
| JP | 2000-268842 A | 9/2000 |
| JP | 2000-340515 A | 12/2000 |
| JP | 2001-236980 A | 8/2001 |

OTHER PUBLICATIONS

Machine English translation of EP 1037296 A1 and EP 1120845 A1.*

* cited by examiner

*Primary Examiner* — Michael Jung
(74) *Attorney, Agent, or Firm* — Kilpatrick Townsend & Stockton LLP

(57) ABSTRACT

The plant (1) with high-temperature fuel cells (7) includes a clamping device for a cell stack (5) and axially aligned chambers (7) for an after-burning. Clamping bars (60) of the clamping device are disposed between the afterburning chambers. Exhaust gas passages connect the after-burning chambers to a heat exchanger (20a) acting as a heat sink. A clamping element (62) of the clamping device is in heat conducting connection with the heat exchanger. Compression springs (63) are respectively mounted on the clamping bars between an end of the clamping bar and a lug (622) of the clamping element. In this arrangement they exert a clamping force onto the clamping bars. The compression springs are shielded by the clamping element from the cell stack so that, thanks to the heat sink, the compression springs are only exposed to moderate temperature at which the clamping force is maintained.

12 Claims, 4 Drawing Sheets

Figure 1:
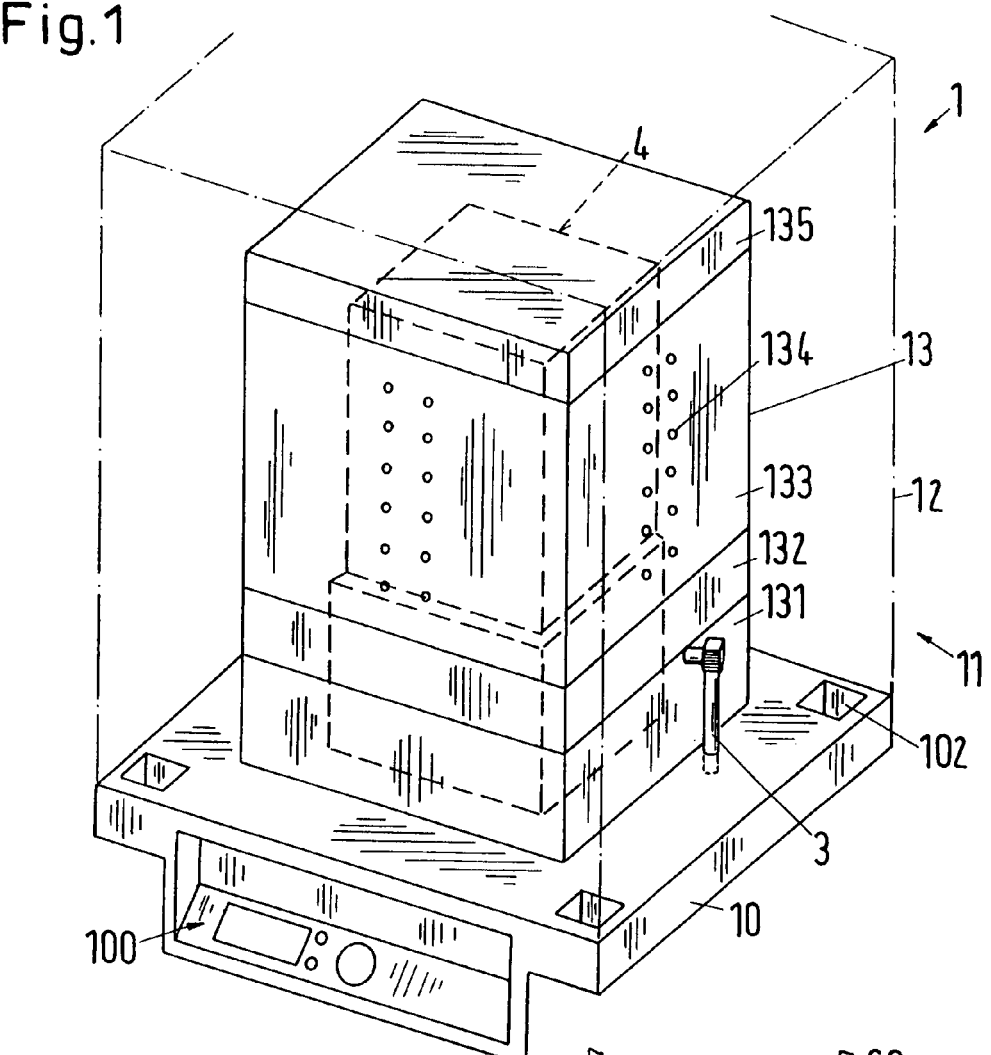

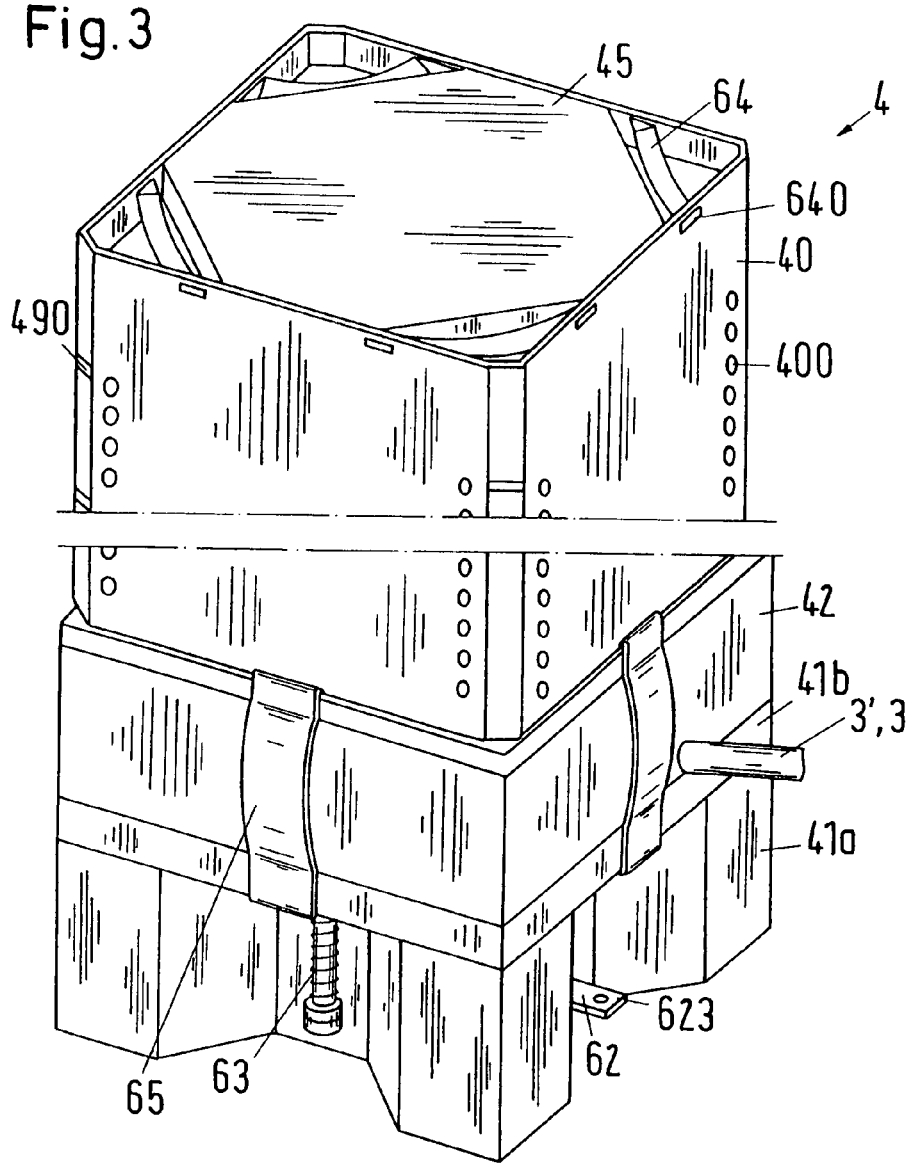
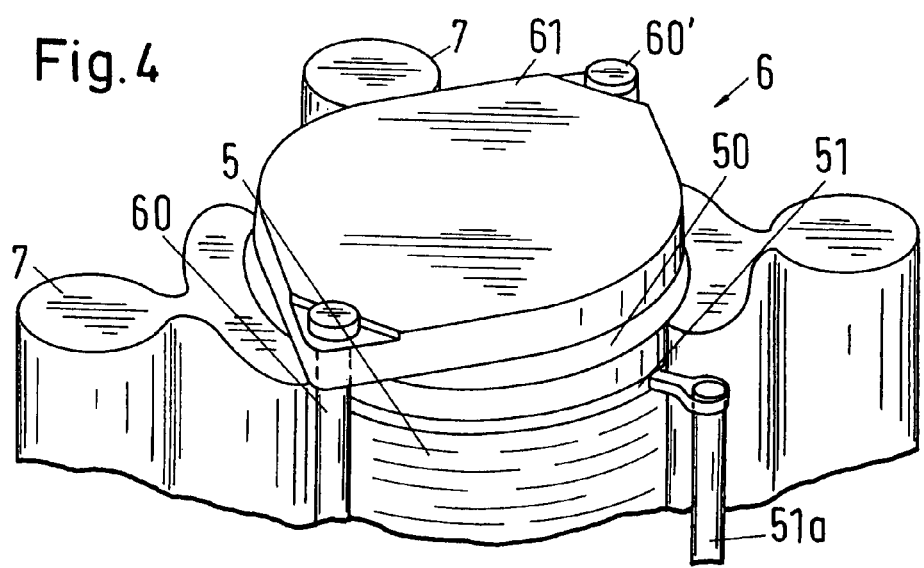

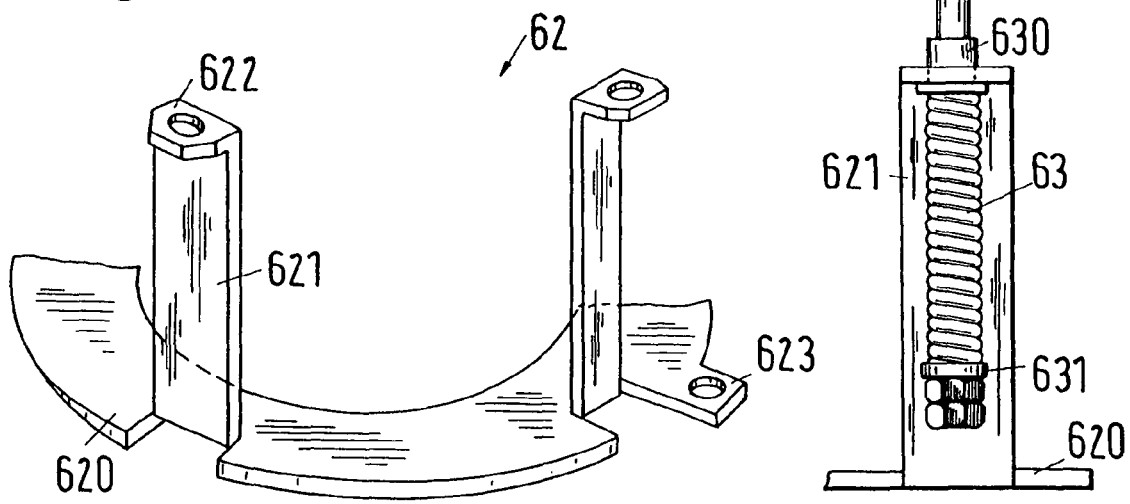
Fig. 5
Fig. 6
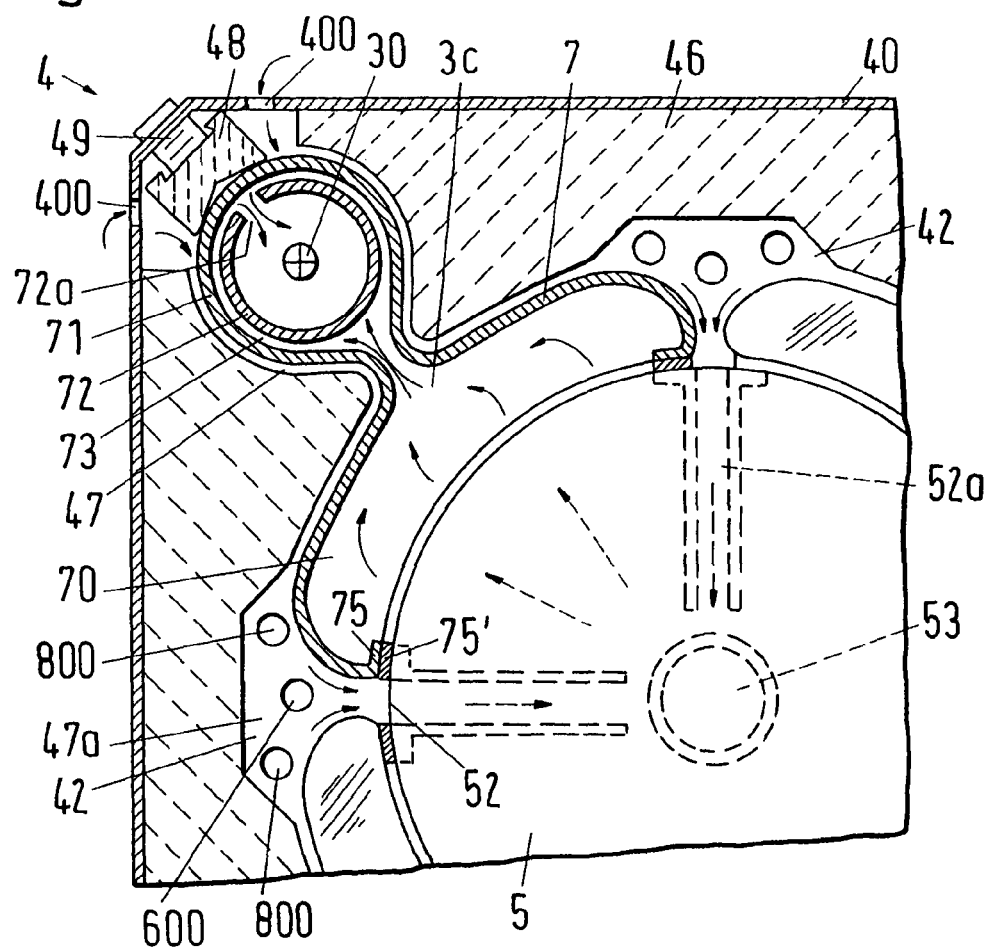
Fig. 7

PLANT WITH HIGH-TEMPERATURE FUEL CELLS AND CLAMPING DEVICE FOR A CELL STACK

CROSS-REFERENCES TO RELATED APPLICATIONS

This application is a U.S. National Phase Application of PCT/CH2006/000096, filed Feb. 14, 2006, which claims benefit of European application number 05405253.5, filed Mar. 21, 2005, the disclosures of both of which are incorporated in their entirety by reference.

The invention relates to a plant with high-temperature fuel cells and a clamping device for a cell stack in accordance with the preamble of claim 1.

A plant of this kind includes a fuel cell battery such as is known from EP-A-1 037 296 (=P.6949). The fuel cells form a cylindrical cell stack with afterburning being carried out at the periphery of the cell stack in axially directed chambers, with exhaust gas at around 1000° C. arising. Entry points are present between the afterburning chambers through which the preheated process air (in brief air) is supplied to the cells for power delivering electro-chemical reactions. A fuel gas is distributed to the cells via an axial passage at the centre of the stack.

Each fuel cell includes two parts namely a so-called PEN element (briefly named PEN) and a disc-like interconnector. The PEN-element which consists of at least three layers, namely P (cathode=positive electrode), E (electrolyte) and N (anode) is an electro-chemically active element with which the electro-chemical reactions can be carried out (at 700-900° C.); it has the form of a thin circular disc which consists of a layer-like solid electrolyte and two electrodes P and N respectively applied by coating. The interconnector separates a space for the air from a space for the fuel gas. It has an architecture with a relief-like profile by means of which a flow of the fuel gas from a central entry point along the PEN to the periphery is made possible, on the one hand. On the other hand, the flow of the air is directed in a particular manner by the architecture; the air is directed from the entry points into a central region and from there along the PEN back to the periphery. At the periphery of the cell stack there are discretely arranged openings for the entry and exit of the gases (air and fuel gas respectively).

The afterburning chambers are surrounded by layers or shells of heat insulating material which, together with the chambers, forms a multi-component sleeve of the cell stack. A reformer is arranged within this sleeve and directly below the cell stack in which the fuel gas is catalytically converted at least partly into CO and $H_2$. In this connection oxygen (air) is mixed with the fuel gas so that a partial oxidation results. The generation of CO and $H_2$ is first possible with the partial oxidation and in addition heat is delivered for endothermic reactions.

The multi-component sleeve is formed as a heat insulating system. Its heat insulating function plays the role of an external recuperator. Instead of the air required in the cells for the electro-chemical processes first having to be preheated in a separate external recuperator, the air, which is initially cold or only slightly preheated, is used as a heat sink, in that the heat flowing away from the cell stack is partly taken up by the air in the sleeve and is returned again to the reaction sites.

The sleeve is of multilayer construction and simultaneously has a passage system for the air flow. Between an outer wall which forms a first layer or shell of the sleeve and the inner components of the sleeve there is a first hollow space in which a distribution and a heating of the air, i.e. cooling of the sleeve takes place. In the passage system which follows the first hollow space a further heating of the air results. Instead of or in addition to the passages porous gas permeable parts can also be incorporated in the sleeve which form a so-called dynamic thermal insulation: the air which flows through the pores of the thermal insulation in the radial direction takes up heat which is transmitted from the cell stack principally by thermal radiation and is absorbed by the material of the thermal insulation. The heat taken up is transported by the air back into the cell stack.

The afterburning chambers are formed as axially directed collecting channels through which the exhaust gas is led. The exhaust gas which is in particular sucked away flows out of the chambers radially outwardly and subsequently flows on axially. Prior to the passage from the sleeve into the cell stack the air is heated up further at the outer walls of the afterburning chambers; correspondingly heat is given up by the exhaust gas which is flowing axially in the chambers corresponding to the heat arising during the afterburning and a part of the heat liberated during the electro-chemical reactions.

The fuel cell battery is used in a plant which is part of a building infrastructure, with the energy which is converted by the fuel cells being utilized in the form of thermal energy (for example for heating purposes) and of electrically energy.

In order that a contact is also actually present between the PEN elements and the interconnectors at all points at which an electrical contact must exist, the cell stack has to be pressed together in the axial direction. For this purpose a clamping device is provided. A clamping device of this kind includes clamping springs (or compression springs) which may not be exposed to high temperatures. Since the cells adopt temperatures above 700° C. in operation the clamping device must be designed so that a permissible temperature is not exceeded in zones in which the clamping springs are arranged.

The object of the invention is to provide a plant with high-temperature fuel cells and a clamping device for a cell stack the clamping means of which does not suffer any damage at high operating temperatures. This object is satisfied by the plant defined in claim 1.

The plant with high-temperature fuel cells includes a clamping device for a cell stack and axially aligned chambers for afterburning. Clamping bars of the clamping device are arranged between the afterburning chambers. Exhaust gas passages connect the afterburning chambers with a heat exchanger acting as a heat sink. A clamping element of the clamping device is in heat transmitting connection with the heat exchanger. Compression springs are respectively placed on the clamping bars between one end of the clamping bar and a lug of the clamping element. They thus exert a clamping force on the clamping bars. The compression springs are screened by the clamping element relative to the cell stack so that the compression springs are only exposed to moderate temperatures thanks to the heat sink at which the clamping force is maintained. The dependent claims 2 to 9 relate to advantageous embodiments of the plants in accordance with the invention.

Figure 2:
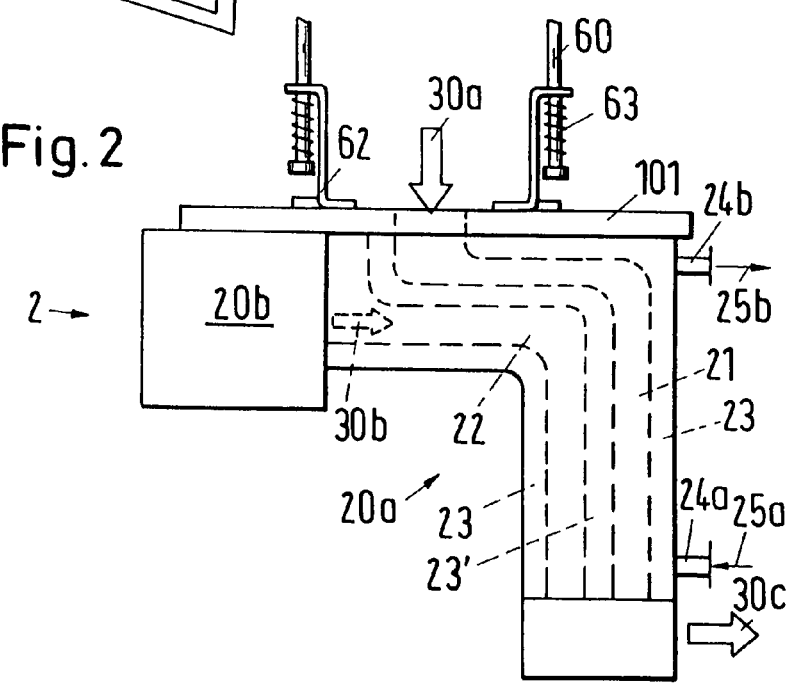
Figure 8:
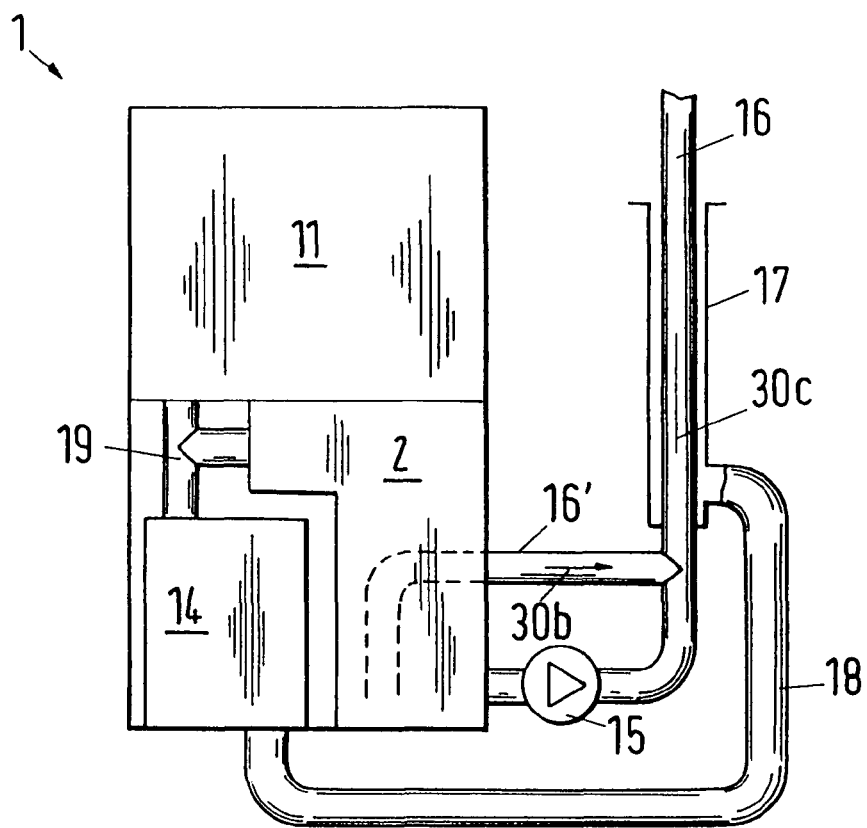
Figure 9:
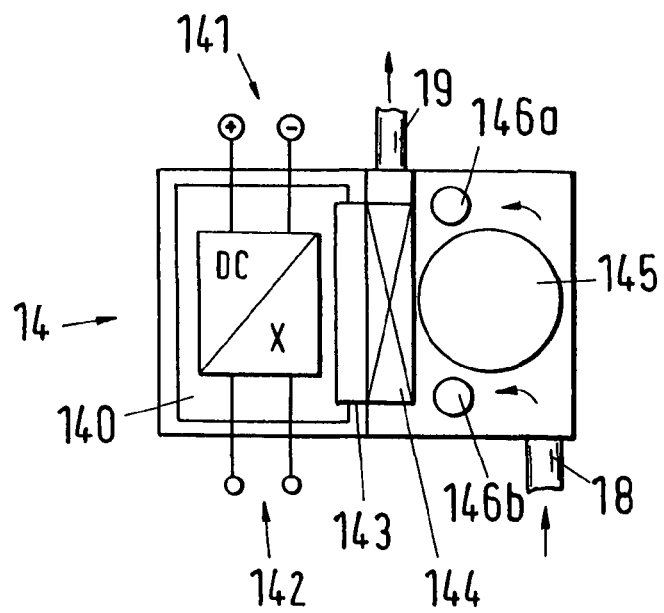

The invention will be explained in the following with reference to the drawings in which are shown:

FIG. 1 an overview of the outer parts of a multi-component sleeve which screens a cell stack of the plant of the invention towards the outside, FIG. 2 a heat exchanger for heating purposes such as is provided for the plant in accordance with the invention, FIG. 3 a part of the multi-component sleeve, the outer wall of which forms a corset-like cage, FIG. 4 an upper end of the clamping device for the cell stack, FIG. 5 a lower end of the clamping device, FIG. 6 a compression spring of the clamping device which brings about clamping forces, FIG. 7 a cross-section through the part shown in FIG. 3, FIG. 8 a schematic illustration of the plant of the invention and its connection to a chimney, and FIG. 9 a schematic illustration of an electronic apparatus having an electronic power circuit which is installed in the plant of the invention for the purpose of control and electrical conversion.

An upper part of the plant 1 of the plant in accordance with the invention —see FIG. 1—is a fuel cell battery 11 which consists of a cell stack 5 (see FIG. 4) and a multi-component sleeve. The sleeve which screens off the cell stack 5 relative to the environment is secured to a table 10 which forms the upper termination of the lower part of the plant 1 and carries the operating elements 100. The multi-component sleeve is in part similarly constructed to a Russian box puppet (="Matrjoschka"). An outer sleeve part 12 indicated in chain-dotted lines of heat insulating material, which is exposed in normal operation of the plant 1 only to temperatures below about 60° C., encloses an inner heat insulating sleeve part 13 which forms a hollow space (not shown) with the inner side of the outer sleeve part 12. Preheated air (process air) enters into corners of the table 10 through openings 102 into the hollow space through which it flows.

The inner sleeve part 13 includes a two-part pedestal 131, 132 (which can also be in one piece), a jacket 133 and a lid 135 (which are adhesively bonded together). The lower pedestal part 131 lies on the table 10. The fuel gas (with the admixing of air for the partial oxidation) is fed through a line 3 into a reformer which is located within the multi-component sleeve at the level of the upper pedestal part 132. The air of the hollow space passes through radial passages 134 in the jacket 133 to a further unit 4 which will be described with reference to the FIGS. 3 to 7. On passing through the passages 134 the air takes up further heat from the inner sleeve part 13. In the region of the passages 134 the inner sleeve part 13 is accordingly locally formed as active thermal insulation. The process air is further heated up in the unit 4 before it enters into the fuel cells. During afterburning in the unit 4 the air becomes a component of an exhaust gas. The exhaust gas enters into axial collecting channels and flows in these to the pedestal of the unit 4 where it passes through radial passages into an axial, centrally arranged, outlet passage. Exhaust gas 30a is discharged from this outlet passage into the lower part of the plant 1: see FIG. 2. The axial collecting channels can also lead directly into the lower part of the plant 1, i.e. without being led together into a common outlet passage.

In FIG. 2 a heat exchanger 20a of heating apparatus 2 is shown which is arranged in the lower part of the plant 1 directly below the table 10. A metallic plate 101, advantageously of aluminium, is a component of the table 10. The fuel cell battery 11 is secured to the plate 101; it is so secured via a clamping device for the cell stack 5 that heat from the hot multi-component sleeve is directed to the heat exchanger acting as a heat sink, so that a temperature which is sufficiently low for springs is present at the base of the clamping device. A gas heating system 20b is provided as an additional heating system for covering peaks of the heat requirement (n particular on cold winter days) or to cover the heat requirement in summer when the fuel cells are also not in operation.

The clamping device includes—see FIGS. 4 to 6—clamping bars 60 which are arranged between the afterburning chambers. A clamping element 62 of the clamping device is in heat conducting connection with the heat exchanger. Compression springs 63 are mounted on the clamping bars 60, in each case between one end of the clamping bars 60 and a lug of the clamping element 62. In this respect they exert a clamping force onto the clamping bars 60. The compression springs 63 are screened by the clamping element 62 relative to the cell stack so that, thanks to the heat sink, the compression springs 63 are exposed only to moderate temperatures which the clamping force is retained. The clamping device is composed of a clamping plate 61, the clamping bars 60, the clamping element 62 and also the compression springs 63. The cells of the stack are pressed against one another between the clamping plate and the clamping element 62.

The heat exchanger 20a includes two separate passages 21 and 22 within a double walled jacket 23, which, together with a partition wall between the channels 21, 22, forms a unitary component through which a heat carrier medium flows. This component is connected to a heating plant for a room heating system (also hot water heating): to a stub 24a for a return line 25a and to a stub 24b for a feed line 25b of the room heating system. In the first passage 21 the hot exhaust gas 30a transmits heat to the heat carrier medium. In addition, in the second passage 22, a second gas, the combustion gas 30b of the gas heating system 20b, gives up heat to the heat carrier medium. The combustion gas 30b flows at a pressure greater than the environmental pressure through the heat exchanger 20a, whereas the pressure of the exhaust gas 30a is smaller because it is pumped with a suction fan (15 in FIG. 8). The cooled gases (arrow 30c) are discharged to the environment through a chimney (chimney 16 in FIG. 8)

FIG. 3 shows the unit 4 which forms the innermost part of the multi-component sleeve. This unit 4 which directly surrounds the cell stack 5 has an outer wall 40 with the function of a corset-like cage. The unit 4 includes axially directed chambers 7 for the afterburning (see the FIGS. 4 and 7). Between the periphery of the stack 5 of the outer region of the sleeve (parts 12, 13) there is a construction which fixes the chambers 7. This construction includes the corset-like cage 40, the cross-section of which lying perpendicular to the stack axis has essentially the shape of a regular polygon (here with four corners). An afterburning chamber 7 is associated with each corner of this polygon. Radial spring forces act respectively from the corners on the associated chamber 7. Details will be described further below with reference to FIG. 7. The air which flows in through the passages 134 of the sleeve part 13 is deflected in a second hollow space (not shown) towards the corners of the cage 40 where it flows through holes 400 into the interior of the unit 4.

The unit 4 is closed at the top end by a lid 45. Leaf springs 64 in the form of downwardly bent metal strips are arranged in the corners of the cage 40. These leaf springs 64 are respectively inserted through two slots 640 in the wall of the cage 40 so that they are active as an elastic fastener means for the lid 45. At the bottom the unit 4 has a three-part pedestal 41a, 41b, 42 which corresponds to the pedestal 131, 132 of the sleeve part 13. The cage 40 is releasably and elastically secured by clamps 65 to the central pedestal part 41b. The reformer to which the gas line 3 leads is disposed in the upper pedestal part 42. A sleeve for the reformer forms, together with a horizontal gas duct section 3'—in an advantageous embodiment—a monolithic piece of a ceramic material which has the form of a tobacco pipe. The reformer, which is advantageously a cylindrical honeycomb body with a catalytic surface coating is inserted into the head of this "tobacco pipe" (with seals between the outer wall of the honeycomb-body and the inner wall of the sleeve). A radiation protection means can also be incorporated in the "tobacco pipe" so that the gas temperature in the base does not get to high. The clamping element 62 with the compression spring 63 is arranged in the lower pedestal part 41*a*. The clamping element 62 is screwed to the table 10 (plate 101, see FIG. 2) at the lugs 623.

The lid 45 serves on the one hand as heat insulation. On the other hand it presses the afterburning chambers 7 downwardly for the purpose of fixing them. For this contact pressure additional clamping means can be provided beneath the lid 45 which act on the chambers 7 individually. Ceramic pins can also be provided for the pressure on the afterburner chambers 7, the pins being guided through the lid 45 and the leaf springs 64 acting on them. A further possibility for the fixation is to screw the chambers 7 on in the pedestal region.

FIG. 4 shows the upper end of the clamping device for the cell stack 5 which is formed from a stable plate, the clamping plate 61. Two clamping bars 60 have heads 60' anchored in bores of the clamping plate 61. The connector bars connect this plate 61 to the clamping element 62 which is shown in more detail in FIG. 5. A thermally and electrically insulating plate 50 is arranged between the clamping plate 61 and the cell stack 5 and is terminated at its upper end by a current collector 51. A current conducting bar 51*a* serves for the conduction of the electrical current picked up in the current collector 51. FIG. 4 also shows the upper end of three afterburning chambers 7, the fourth of these chambers 7 has been omitted.

The clamping plate 61 can also have a different shape from that shown in FIG. 4. Thus, by way of example, it can also be of beam-like shape. The material from which the clamping plate 61 is to be manufactured must remain stable at the high temperatures which occur in the vicinity of the hot cell stack 5. A metallic alloy or a ceramic material, for example silicon nitride, comes into consideration as the material.

The FIGS. 5 and 6 show the clamping element 62 which forms the lower element of the clamping device. The compression spring which brings about a clamping force is attached to a lug 622 which forms the head end of a yoke 621. This yoke 621 starts at a ring 620 (only one half shown), which is secured to the plate 101 of the table 10 at at least two lugs 623. The clamping bar 60 is pushed into a sleeve 630 at the lug 622. The compression spring 63 is disposed between a lower ring disc 631, which is held against movement downwardly by two nuts, and the sleeve 630. Thanks to the heat dissipation through the yoke 621 to the ring 620 and from there to the plate 101 and also to the heat exchanger 20*a* the compression spring 63 never becomes impermissibly hot so long as the heat exchange medium of the heat exchanger 20*a* exerts a cooling action (maximum permissible temperature of the spring: 300° C.). The clamping action exerted by the compression springs 63 on the clamping rods 60 does not therefore weaken.

FIG. 7 shows a partly drawn cross-section through the unit 4 shown in FIG. 3. Radial forces act from the four corners of the corset-like cage 40 on the four afterburning chambers 7. The chamber 7 has an outer wall 71 and includes a trough-like afterburning chamber 70 which has a closed edge as a sealing edge 75. The sealing edge 75 is pressed by the radial spring force onto a sealing strip 75' between chamber 7 and stack 5. The trough-like space 70 is connected via a narrow passage 73 to an axial collecting passage 72 for exhaust gas 30. This collecting passage 72 is disposed between the trough-like space 70 and the corner of the corset-like cage 40.

The corset-like cage 40 has the shape of a four-cornered prism. The corners are blunt, i.e. the form of these corners results by cutting away a triangle from a pointed corner. The radial spring forces can be generated with strips 48 which lie on the afterburner chambers 7 and leaf springs 49. The leaf springs 49 are suspended in slots 490 in the blunt corners. The strips 48 preferably consist of a ceramic material which is a poor conductor of heat. The leaf springs 49 are thus protected from the high temperature of the afterburning chamber 7.

The axial collecting passage 72 forms, together with a region of the outer chamber wall 71, the narrow passage 73 or a part of the narrow passage 73. The narrow passage 73 largely has the shape of a ring gap. The collecting passage 72 has an elongate gap 72*a* which serves as a passage for exhaust gas 30 from the narrow passage 73 into the collecting passage 72. The cross-section of the afterburning chamber 7—including the collecting passage 72—is of mirror-symmetry. The axis of symmetry lies on the bisector of the angle which is spanned by the corset-like cage 40 in the corner.

Filling bodies 46 are arranged between the corset-like cage 40 and the afterburner chambers 7. Gap-like passages 47 are kept free between the filling bodies 46 and the surfaces of the chambers 7. These lead from the corners along the chamber wall 71 to air entry points 52 of the cell of the stack 5. The chambers 7 and the filling bodies 46 are respectively manufactured of a material which is resistant to high temperatures and transmits heat well (metal or a ceramic material such as for example silicon carbide, steatite) and from a ceramic material which conducts heat poorly.

As already described in the introduction, the fuel cell includes a PEN and an interconnector. The interconnector, which separates a space for the air from a space for the combustion gas has a relief-like profile through which the flow of air is deflected in a special manner. The air passes through radial passages 52*a* from the air entry points 52 into a central region and from there along the PEN back to the periphery. At the other side of the PEN the reformed fuel gas (containing CO and $H_2$) flows from a central passage 53 which extends along the axis of the cell stack 5 to the periphery. The two radially outwardly flowing gas flows (process air and combustion gas) mix in the afterburning chambers 70 where the non-reacted fuel residues are burned. The exhaust gas 30 which arises in this way flows on further to the collecting passages 72. Thanks to the narrow passages 73 the flow is largely horizontally directed. A vertical outflow first takes place in the collecting passages 72. Practically no heat is any longer transmitted from the collecting passages 72 to the air to be heated in the passages 47, so that practically no axial temperature gradients are formed.

Thanks to the elastic fixation through the construction with the corset-like cage 40 a seal results between the stack and the sealing edge 75 of the trough-like afterburning space 70. In addition to the elastic fixation of the lid 45 at the cage 40 a construction is present which results in a compensation of dimensional inaccuracies which are unavoidable as a result of differential thermal expansion behaviour of the diverse components.

The filling bodies 46 have at their centre a recess through which a vestibule 47*a* always remains open before the air entry points 52. In FIG. 7 one is looking from within the vestibule 47*a* onto the surface of the pedestal part 42. There two holes 800 and a hole 600 can be seen. The hole 600 exists for the clamping rod 60 of the clamping device or of the current conducting rod 51*a*. Heating rods or tubular heating bodies (not shown) are guided through the holes 800 which are required for the starting up of the plant. In order that the same flow conditions preferably arise in all vestibules 48 a "dummy rod" is additionally used. Only one current conducting rod 51*a* is required and two positions are available for it. The "dummy rod" is associated with the extra position.

FIG. 8 shows a schematic representation of the plant 1 of the invention and its connection to a chimney 16 through which the exhaust 30*c* is transmitted to the environment.

Fresh air is sucked in from the environment via a sleeve tube 17 and is preheated at the surface of a lower region of the chimney 16. The fuel cell battery 11 is mounted on the heating apparatus 2. An electronic apparatus 14 with electronic power system—see FIG. 9—is connected to an induction tube 18 for air, through which a connection is established to the sleeve tube 17. After the air has passed through the electronic apparatus 14 it enters through a distribution tube 19 into the fuel cell battery 11 and—optionally, when additional heating has been set in operation—into the gas heater 20$b$ (see FIG. 2). A suction fan 15 conveys the exhaust gas 30$a$ of the fuel cell battery 11 into the chimney 16. Exhaust gas 30$b$ of the gas heater 20$b$ passes through a separate duct 16' into the chimney 16. A second fan or a ventilator for the additional heating is not shown. FIG. 9 shows a schematic representation of the electronic apparatus 14 which is incorporated in the plant 1 of the invention for the purpose of controlling and electrical transformation using a converter 140. In the converter 140, two inlet poles 141 of which are connected to the fuel cell battery 11, a DC current is converted into a transformed current or a useful voltage X, which is preferably an alternating voltage. The useful voltage X is applied via two output poles 142 to a consumer (for example an electrical power supply). The air sucked in through the tube 18 flows around a transformer 145 and also further components 146$a$, 146$b$ (for example diodes, filters, current smoothing chokes) and finally flows between ribs of a cooling body 144 to the distribution tube 19. The cooling body 144 dissipates lost heat from elements 143 of the electronic power system.

The overall efficiency of the plant 1 is improved by the special air guidance since the heat loss which arises through the electrical conversion is dissipated to the process air. The zones which are to be cooled are designed such that the pressure loss of the air flow is as small as possible and the cooling action on the named components or elements is as large as possible. Thanks to the forced cooling (compared to a natural convection) the cooling body 144 can be made relatively small. When a maximum of electric power is generated with the fuel cell battery 11, then the air through-flow is also a maximum and consequently the performance of the forced cooling. This cooling has a self-regulating behaviour: if the power of the fuel cell battery 11 is reduced then the air requirement reduces accordingly, it is still sufficient to dissipate the reduced heat loss.

The invention claimed is:

1. A plant having high temperature fuel cells configured to operate at temperatures above 700° C., a clamping device for a cell stack and axially aligned chambers for an afterburning process, wherein a plurality of clamping bars of the clamping device are disposed between the afterburning chambers and exhaust gas passages of the afterburning chambers are connected to a heat exchanger acting as a heat sink,
    wherein a clamping element of the clamping device is in a thermally conducting connection with the heat exchanger;
    wherein compression springs are mounted on the plurality of clamping bars between an end of a respective clamping bar of the plurality of clamping bars and a lug of the clamping element and adapted to exert a clamping force on the plurality of clamping bars; and
    wherein the compression springs are screened relative to the cell stack by the clamping element so that a temperature of the compression springs is maintained at 300° C. or less by the heat exchanger acting as a heat sink when the fuel cells are operating at temperatures above 700° C. while the clamping force is maintained; and
    wherein the heat exchanger is adapted for connection to a feed line and to a return line of a heating plant for a room heating system or for hot water heating.

2. A plant in accordance with claim 1, wherein the heat exchanger is part of a heating apparatus, wherein the heating apparatus is configured to burn a fuel inside the heating apparatus to generate a combustion gas for heating purposes; wherein the heat exchanger includes two separate passages for the combustion gas generated by the burned fuel and for the exhaust gas from the afterburning process, respectively, and wherein heat is transferred from the passages to a heat carrier medium in operation, with the heat being transported to a consumer by the heat carrier medium for room heating and/or hot water heating.

3. A plant in accordance with claim 2, wherein the two separate passages are disposed within a double walled jacket which, together with a partition wall between the passages, forms a unitary component through which a heat carrier medium flows in operation.

4. A plant in accordance with claim 2, wherein the passage for the exhaust gas is connected to a suction fan.

5. A plant in accordance with claim 1, wherein the clamping device is assembled from a clamping plate, the plurality of clamping bars, the clamping element and also the compression springs and wherein the cells of the stack are pressed against one another between the clamping plate and the clamping element.

6. A plant in accordance with claim 1, wherein the clamping device together with the afterburning chambers and a cage in which the chambers are enclosed form an inner unit that together with further parts arranged around the inner unit form a multi-component sleeve of the cell stack in which air supplied during operation of the plant can be heated.

7. A plant in accordance with claim 6, wherein a cross-section of the cage lying perpendicular to the stack axis has a shape that is substantially a regular polygon with a plurality of corners, wherein each corner of the polygon shaped cross-section is associate with an afterburning chamber, and wherein the plant is configured such that radial spring forces act from a respective corner on the associated afterburning chamber.

8. A plant in accordance with claim 1, wherein four axially directed air supply zones with air entry points of the cells are disposed at the periphery of the cell stack between four afterburning chambers; wherein a respective clamping bar of the plurality of clamping bars extends in two air guiding zones which lie directly opposite one another and wherein a current conducting bar is arranged in the two other air supply zones.

9. A plant in accordance with claim 1, wherein a pedestal construction with heat insulating components is disposed between the cell stack and the heat exchanger such that the clamping element provides a connection which bridges the pedestal construction between the one end of the cell stack and the heat exchanger.

10. A plant in accordance with claim 9, wherein the heat exchanger has an end plate which consists of a material which conducts heat well such that the clamping element is screwed onto the end plate.

11. A plant in accordance with claim 10, wherein electrical connection lines for electrical heating rods and current conducting bars are attached on the end plate so that the electrical connection lines are only exposed to moderate temperatures in operation of the plant due to this arrangement.

12. A plant in accordance with claim 1, further including:
    a suction tube for air that is required for electro-chemical reactions in the cells and an electronic apparatus with an electronic power system;

wherein an air guide is arranged downstream of the suction tube by means of which the air can be exploited for the cooling of the electronic power system and then can be conducted further into heat dissipating parts of the plant.

* * * * *